United States Patent
Moritz et al.

(10) Patent No.: US 10,117,108 B2
(45) Date of Patent: Oct. 30, 2018

(54) METHOD AND DEVICE FOR CONTROLLING AN AUTONOMOUS DEVICE

(71) Applicant: TELEFONAKTIEBOLAGET LM ERICSSON (PUBL), Stockholm (SE)

(72) Inventors: Simon Moritz, Stockholm (SE); Åsa Bertze, Spånga (SE); Tony Larsson, Upplands Väsby (SE); Mattias Lidström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 116 days.

(21) Appl. No.: 15/128,469

(22) PCT Filed: Mar. 28, 2014

(86) PCT No.: PCT/SE2014/050377
§ 371 (c)(1),
(2) Date: Sep. 23, 2016

(87) PCT Pub. No.: WO2015/147715
PCT Pub. Date: Oct. 1, 2015

(65) Prior Publication Data
US 2017/0111803 A1   Apr. 20, 2017

(51) Int. Cl.
*H04W 16/18* (2009.01)
*H04W 24/02* (2009.01)
(Continued)

(52) U.S. Cl.
CPC .......... *H04W 16/18* (2013.01); *G06N 99/005* (2013.01); *H04W 16/22* (2013.01);
(Continued)

(58) Field of Classification Search
CPC ..... H04W 16/18; H04W 16/22; H04W 24/02; H04W 76/10; H04W 76/02; H04W 88/08
See application file for complete search history.

(56) References Cited

U.S. PATENT DOCUMENTS

2004/0002988 A1 * 1/2004 Seshadri ........... G06F 17/30516
2006/0223546 A1   10/2006 Claussen
(Continued)

FOREIGN PATENT DOCUMENTS

| WO | 9707609 A2 | 2/1997 |
| WO | 2013/002825 A2 | 1/2013 |
| WO | 2013030834 A1 | 3/2013 |

OTHER PUBLICATIONS

Duvergne, "Skycall: Drones to Lead MIT Campus Tours?" Slice of MIT, MIT Alumni Association, Oct. 3, 2013.
(Continued)

*Primary Examiner* — Benjamin H Elliott, IV
(74) *Attorney, Agent, or Firm* — Patent Portfolio Builders PLLC

(57) ABSTRACT

It is presented a method for controlling an autonomous device (4) of a cellular network (5). The method is performed by a network device (20) and comprises the steps of: predicting (43) a need to increase coverage of the cellular network or a need to increase capacity of the cellular network, comprising the steps of: inputting live data features into a trained classifier (80); and outputting a launch class from the classifier (80); and activating (45) an autonomous device (4) of the cellular network, to improve the cellular network. Corresponding network devices, computer program and computer program product are also presented.

19 Claims, 5 Drawing Sheets

(51) Int. Cl.
  *G06N 99/00*  (2010.01)
  *H04W 16/26* (2009.01)
  *H04W 76/10* (2018.01)
  *H04W 16/22* (2009.01)
  *H04W 88/08* (2009.01)

(52) U.S. Cl.
  CPC ........... *H04W 16/26* (2013.01); *H04W 24/02* (2013.01); *H04W 76/10* (2018.02); *H04W 88/08* (2013.01)

(56) References Cited

U.S. PATENT DOCUMENTS

| | | | |
|---|---|---|---|
| 2010/0088410 A1 | 4/2010 | Ridley | |
| 2010/0150027 A1 | 6/2010 | Atwal et al. | |
| 2012/0142328 A1* | 6/2012 | Awoniyi | H04W 36/22 455/418 |
| 2012/0185481 A1* | 7/2012 | Bjork | G06Q 30/02 707/737 |
| 2013/0163565 A1 | 6/2013 | Lee et al. | |
| 2013/0311468 A1* | 11/2013 | Hjelm | G06Q 10/06 707/737 |
| 2015/0295856 A1* | 10/2015 | Karthikeyan | H04L 65/80 370/230 |
| 2017/0111803 A1* | 4/2017 | Moritz | H04W 76/10 |

OTHER PUBLICATIONS

International Search Report and Written Opinion dated Dec. 19, 2014 in related International Application No. PCT/SE2014/050377.
Parrot, "AR.Drone2.0, Elite Edition," http://ardrone2.parrot.com, retrieved Mar. 24, 2014.
Extended European Search Report in corresponding European Application No. 14 886 680.9 dated Jan. 1, 2017.
Office Action in corresponding European Application No. 14 886 680.9 dated Feb. 10, 2017.
R. C. Qiu, et al.; "Machine Learning"; Cognitive Radio Communications and Networking: Principles and Practice;First Edition; John Wiley & Sons, 2012; Chapter 7; pp. 283-321.

* cited by examiner

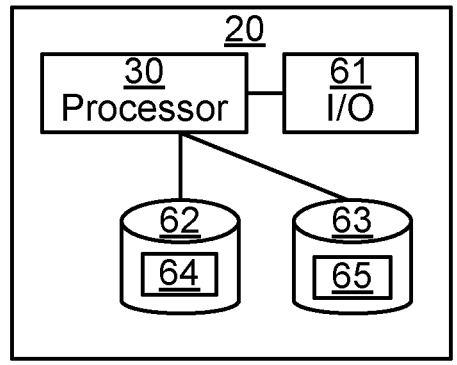
Fig. 5
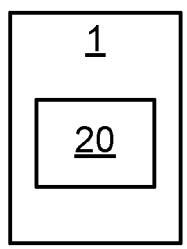 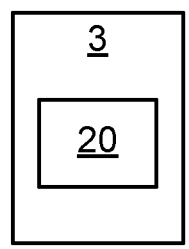 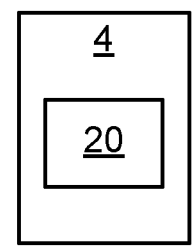
Fig. 6A  Fig. 6B  Fig. 6C
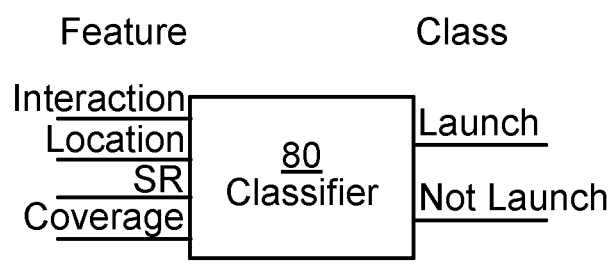
Fig. 7

METHOD AND DEVICE FOR CONTROLLING AN AUTONOMOUS DEVICE

TECHNICAL FIELD

The invention relates to a method, network devices, a computer program and a computer program product for controlling an autonomous device.

BACKGROUND

In today's mobile networks, base stations have a fixed coverage zone in most cases. The range for each base station varies based on the amount of connected devices, the layout of the geographical area, antennas and several other parameters. But in principle the base stations cover a fixed area.

There are today possibilities to connect a temporary base station to an existing mobile network in order to increase the capacity for a specific area for the time needed. In India and in Ghana there are examples where companies specialized in hardware are renting out network capacity temporarily, based on temporary network demand. They temporarily increase the network capacity by driving a truck containing a base station with antennas on the roof to the location that required more coverage or capacity.

It is known to use a drone for taking photos through control of a smartphone, as presented on http://ardrone2.parrot.com/, retrieved on 24 Mar. 2014.

SUMMARY

It is an object of the invention to improve network access qualities in a cellular network.

One problem with existing technologies providing temporary mobile network capacity is that it is often expensive to provide and it is further often tailored only for big crowds. It also requires a lot of manual labour and skill in order to place and configure the access point in a sweet spot of the cellular network to support as many devices as possible without interfering with existing infrastructure.

According to a first aspect, it is presented a method for controlling an autonomous device of a cellular network. The method is performed by a network device and comprises the steps of: predicting a need to increase coverage of the cellular network or a need to increase capacity of the cellular network, which predicting comprises the steps of: inputting live data features into a trained classifier; and outputting a launch class from the classifier. The method further comprises an activation of an autonomous device of the cellular network, to improve the cellular network. By activating the autonomous device in dependence on a need to increase coverage or capacity of the cellular network, network access qualities are improved.

The method may further comprise the step of: connecting a wireless communication device to the cellular network through the autonomous device. In this way the wireless communication device is provided with improved network access.

The step of activating may comprise initiating a move of the autonomous device from a first idle location to a second active location. Since the autonomous device may be put in either idle mode and in active mode, flexibility of the cellular network is improved.

The autonomous device may be outside high data capacity coverage of the cellular network in the first idle location and is connectable to the cellular network in the second active location with high data capacity. By having the active location in a high data capacity spot of the cellular network, the network access qualities may be improved.

The step of activating may comprise signalling the autonomous device over a low data capacity protocol. It may be sufficient for the autonomous device to receive initiating instructions over low data capacity protocols, in order for it to move to a high data capacity spot.

The live data features may comprise one or more of the following: signal strength, location, wireless communication device activation, performance measurement, and configuration measurement. By classifying one or more of these features, a likelihood for a launch class may be predicted.

The classifier may be a Support Vector Machine (SVM), a decision tree, a neural network or a Bayesian network, wherein machine learning may be applied for determination of the need.

The step of predicting may comprise utilization of a time series forecasting.

The step of determining may comprise detecting one or more of the following: application use, scheduled event, user action on wireless communication device, and measurements in a wireless communication device. Detection of an event or action may indicate a need for increased capacity in the cellular network.

The method may comprise the further step of: deactivating the autonomous device. By moving the autonomous device to e.g. an idle location, it may charge its batteries when driven in that way.

The method may comprise the further steps of: collecting use data of a wireless communication device; storing the use data; and identifying a use pattern from the stored use data. By identifying a use pattern, the need of improved cellular network may be predicted.

According to a second aspect, it is provided a network device for a cellular network. The network device is arranged to control an autonomous device of the network device comprising: a processor; and a computer program product storing instructions that, when executed by the processor, causes the network device to: predict a need to increase coverage of the cellular network or a need to increase capacity of the cellular network, comprising: input live data features into a trained classifier; and output a launch class from the classifier; and activate an autonomous device of the cellular network, to improve the cellular network.

According to a third aspect, it is provided a network device for a cellular network. The network device is arranged to control an autonomous device, the network device comprising: a determination manager configured to determine a need to increase coverage of the cellular network or a need to increase capacity of the cellular network; a prediction manager configured to: input live data features into a trained classifier; and output a launch class from the classifier; and an activation manager configured to activate an autonomous device of the cellular network, to improve the cellular network.

According to a fourth aspect, it is provided a computer program for controlling an autonomous device of a cellular network. The computer program comprising computer program code which, when run on a network device, causes the network device to: predict a need to increase coverage of the cellular network or a need to increase capacity of the cellular network, comprising: input live data features into a trained classifier; and output a launch class from the classifier; and activate an autonomous device of the cellular network, to improve the cellular network.

According to a fifth aspect, it is provided a computer program product comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a schematic diagram illustrating some components of a network device;

FIGS. 6A-6C are schematic diagrams illustrating various locations where the network device of FIG. 5 can be implemented;

FIG. 7 is a schematic diagram illustrating a classifier; and

DETAILED DESCRIPTION

Figure 1:
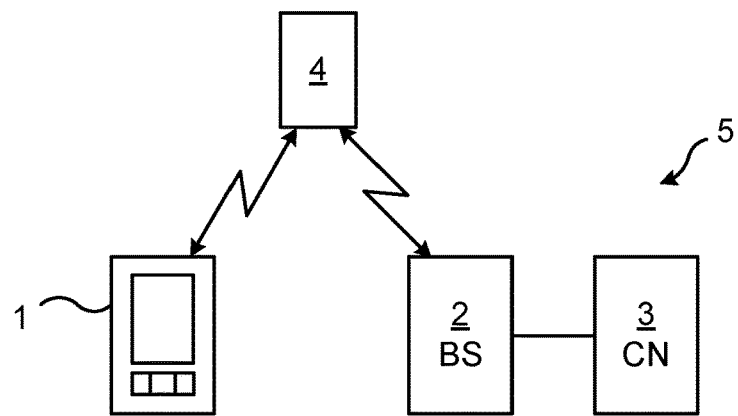
FIG. 1 is a schematic diagram illustrating an environment where embodiments presented herein can be applied.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Dynamic, configurable base stations may be provided in a cellular network. A cellular network having dynamic, reconfigurable base stations makes it easy to temporarily add a base station thereto in production without disturbing on-going traffic. I.e. nearby base stations may dynamically reconfigure their radio signal strength to best suit the new context.

Tethering, such as using a mobile phone to connect a laptop to the internet, allows wireless communication devices to connect to each other to share e.g. an internet connection. Technologies to connect wireless communication devices today are primarily tethering through Wi-Fi or Bluetooth.

A general idea with utilization of an autonomous device is to enable, increase and/or improve the network coverage or network capacity for any given spatial location and time. By an autonomous device is meant a device that performs behaviours or tasks without human interaction. When an autonomous device e.g. receives a launch instruction it can move to a desired location without human interaction. An autonomous device may be provided with batteries and/or supercapacitors, such that it automatically can recharge the batteries/supercapacitors and thus be provided with a theoretically infinite power supply.

An Autonomous Spatial Temporal Access Point (ASTA) is an implementation of an autonomous device that provides access point functionality, wherein the functionality is provided at a location during a limited period of time. A limited period of time shall here be seen as a time where the ASTA is temporarily used as a removable and temporary access point, which is a shorter period of time than the time where mounted, fixed access points/radio base stations are used in the network. Location is here referred to as a spatial area wherein a requesting device would need an increase in coverage and or capacity. Examples of locations of interest include spatial areas outside cell range, cellular network coverage, or a location with high current cellular network usage. An example of the temporal aspect is the need to temporarily improve coverage for a user in a given location.

An example of a spatial-temporal situation includes a user being in a countryside house located in a valley wherein the user would like to gain access to the cellular network for one week. Another example is when a user would like to gain access in an area where the closest cellular base station has too many connected devices already, but through the ASTA could link to a further away base station.

An increased coverage through an autonomous device may be triggered by a special event. A triggering event may include (1) a person/device/group setting up a voice call, (2) a person/device/group trying to access data traffic but fails, (3) a person/device/group is predicted to do any of the above.

A wireless communication device usage may be analyzed in order to determine when to trigger an autonomous device to launch from an idle mode to an active mode. The autonomous device may in the idle mode be charging on the ground connected to power. The autonomous device may in the active mode connect the wireless terminal to a cellular network. The wireless communication device usage may be analyzed in order to determine when to trigger that the autonomous device should go back to its idle mode.

A wireless communication device outside the network coverage range, or with only limited access to the cellular network, may trigger when to launch an autonomous device so it places itself in network coverage and act as a bridge to the cellular network. Example of such triggering events includes:

Current signal strength and predicted signal strength. Low predicted signal strength in combination with some other event indicating that the user will initiate communication that will trigger the launch. Such a prediction model is built using historical data for the selected geographical region. High predicted signal strength would not trigger the launch of the autonomous device. The logic of the prediction model may be embodied either on the wireless communication device itself, like in the case of a smartphone, since that is the one needing the capacity, and other times the logic may instead be kept in the autonomous device, like in the case of a refrigerator needing network access.

Location information so that it first of all is ensured that the wireless communication device is in range of the autonomous device but secondly also it is ensured that local geographical differences is taken into consideration. The area around the autonomous device could vary a lot in signal strength, e.g. there may be specific spots within the area that always have bad coverage.

From the location information one can also derive the past network capacity from the history data.

Device interaction, service usage as well as sensor readings that someone is actually touching or looking at a mobile phone may be used to trigger launch of an autonomous device. From usage patterns, collected in a similar manner as e.g. Ericsson Apps background service or the iOS Facebook usage pattern predictor may be used to trigger launch of an autonomous device. With such information it is possible to learn/calculate a probability of network access at any given time and then use that to trigger the ASTA to launch in due time.

Different usage patterns can be exemplified by: A study of historical data based on previous wireless communication device actions that lead to a network usage, such as data usage. The historical data can for instance be related to data usage tied to a specific service, such as video streaming via an internet browser or via an application installed in the wireless communication device. A prediction model created on history data that predicts with a likelihood connection of the wireless communication device to the network.

Also, the cellular network may trigger an ASTA to activate itself. An example of such a trigger is that someone is setting up a mobile phone call to a rural wireless communication device that is outside the network coverage. This solution works as long as some signaling can be transmitted to the ASTA while it is in an idle mode. An alternative implementation may signal a resource request to the ASTA that once in a while activates itself by placing itself in network coverage and store a resource request schedule for later use.

Just before a scheduling event is due the ASTA may be arranged to find network coverage and trigger a communication channel to the wireless communication device outside the fixed network coverage.

An implementation example of the scheduled event may be an active request or a calendar event, such as a video or phone conference meeting, e.g. provided from a calendar server accessible from the cellular network, or on the wireless network device itself.

The ASTA may also periodically place itself in network coverage and download new files and emails that are transmitted to a wireless communication device outside the fixed network coverage.

Advantages possible to achieve with utilization of an autonomous device as presented herein are e.g. increased app coverage, also in areas that traditionally are hard to reach such as summer houses, valleys, archipelago, city centers, due to too thick walls, due to too close buildings, when there are too many users on the nearest base station, but one cannot reach the next; more satisfied customers that will get an improved service; new service offering from an operator targeting these special cases; the network coverage may be more dynamic, having coverage where it is needed instead of coverage evenly distributed also in places which does not need coverage. The cellular infrastructure may thus adapt to the user needs instead of forcing users to adapt to the cellular infrastructure. Further, network planning can be helped by looking at the use of ASTAs within a given area of interest. Further, an ASTA may be personal and could be brought with you were ever you go. It may even be for free to use by an end-user if they are feeding back network usage information to the operators.

FIG. 1 is a schematic diagram illustrating a cellular network 5 providing an environment where embodiments presented herein can be applied. The cellular network 5 is connected to a wireless communication device 1 in connectivity with an autonomous device 4, in turn in connectivity with a base station 2, such as an eNodeB in a Long Term Evolution (LTE) access network, connected to a core network 3, such as an Evolved Packet Core network.

The term wireless communication device 1 may be or alternatively be termed as a mobile communication terminal, user equipment, mobile terminal, user terminal, user agent, machine-to-machine device etc., and can be, for example, what today are commonly known as a smartphone or a tablet/laptop with wireless connectivity. Moreover, the wireless communication device 1 may, but does not need to, be associated with a particular end user. The wireless communication device 1 may also be a telematics unit embedded in a vehicle such as a car, bus and truck, and be connected to a vehicle-internal network for exchange of e.g. vehicle or driver data with a fleet management system connected to the vehicle via the cellular network 5. The wireless communication device 1 may also be a unit mounted in a dashboard of a vehicle for displaying information and communicating with the driver or passengers of the vehicle and being connected to the telematics unit embedded in the vehicle.

Figure 2A:
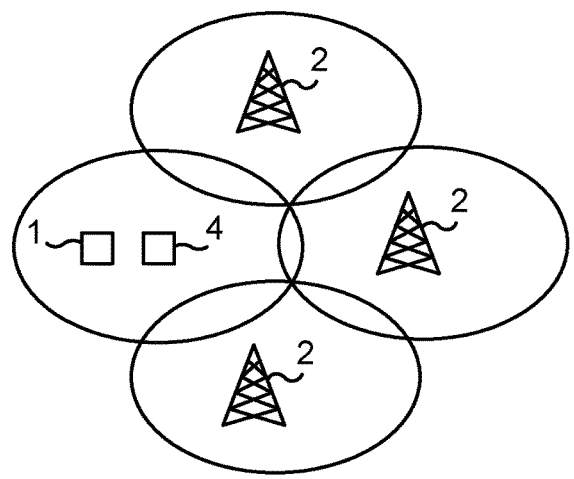
FIGS. 2A and 2B are schematic diagrams illustrating cells of a cellular network.

FIG. 2A illustrates a wireless communication device 1 outside sufficient coverage, or totally outside, of the cellular network 5, as covered by three base stations 2. The wireless communication device 1 is however within coverage of the cellular network 5, when the autonomous device 4 is active and in connectivity with a base station 2.

Figure 2B:
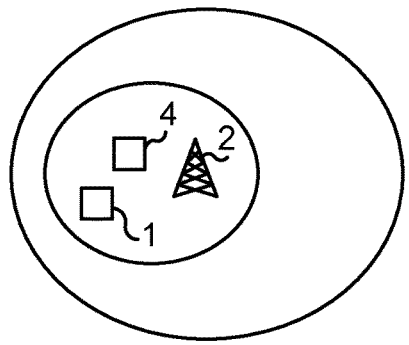

FIG. 2B illustrates a wireless communication device 1 within coverage of the cellular network 5, covered by a base station 2, however only connected to the cellular network 5 through a low data capacity protocol. The low data capacity protocol may be e.g. Extensible Messaging and Presence Protocol (XMPP) or Session Initiation Protocol (SIP). The wireless communication device 1 is however within high data capacity coverage of the cellular network 5, when the autonomous device 4 is active and in connectivity with a base station 2.

A network device 20 for a cellular network 5 is presented with reference to FIG. 5, which network device 20 is arranged to activate the autonomous device 4 based on a need to increase coverage or capacity of the cellular network 5. The network device 20 comprises: a processor 30; and a computer program product 62 storing a computer program 64 with instructions that, when executed by the processor 30, causes the network device 20 to: predict 43 a need to increase coverage of the cellular network or a need to increase capacity of the cellular network, comprising input live data features into a trained classifier 80; and output a launch class from the classifier 80; and activate 45 an autonomous device 4 of the cellular network, to improve the cellular network.

FIG. 5 is a schematic diagram showing some components of the network device 20. The processor may be provided using any combination of one or more of a suitable central processing unit (CPU), multiprocessor, microcontroller, digital signal processor (DSP), application specific integrated circuit etc., capable of executing software instructions if a computer program 64 stored in a memory. The memory can thus be considered to be or form part of the computer program product 62. The processor may be configured to execute methods described herein with reference to FIGS. 4A-4B.

The memory may be any combination of read and write memory (RAM) and read only memory (ROM). The memory may also comprise persistent storage, which, for example, can be any single one or combination of magnetic memory, optical memory, solid state memory or even remotely mounted memory.

A second computer program product in the form of a data memory 63 may also be provided, e.g. for reading and/or storing data during execution of software instructions in the processor 30. The data memory 63 can be any combination of read and write memory (RAM) and read only memory (ROM) and may also comprise persistent storage, which, for example, can be any single one or combination of magnetic memory, optical memory, solid state memory or even remotely mounted memory. The data memory 63 may e.g. hold other software instructions 65, to improve functionality for the network device 20.

The network device 20 may further comprise an I/O interface 61 including e.g. a user interface. Other components of the network device 20 are omitted in order not to obscure the concepts presented herein.

The instructions may comprise the further instruction to connect 46 the wireless communication device 1 to the cellular network 5 through the autonomous device 4.

The autonomous device 4 may communicate with a base station 2 of the cellular network 5 over 3GPP standards, and communicate with the wireless communication device over e.g. Wi-Fi or Bluetooth. In this case the autonomous device is very similar to a wireless mobile broadband router. The cellular network then sees and treats the autonomous device as a normal wireless communication device, and the wireless communication device sees the autonomous device as a wireless router.

The autonomous device 4 may communicate with a base station 2 of the cellular network 5 over 3GPP standards, and also with the wireless communication device over 3GPP standard, in which case the autonomous device acts as a relay. This alternative requires more coordination with the cellular network, compared to when the autonomous device acts similarly to a wireless router, since relaying on the same frequency as the cellular network requires coordination between the base stations and the relays. When the autonomous device acts similarly to a wireless mobile broadband router it does not have to have any coordination with the cellular network, just like wireless mobile broadband router products do not do.

The instruction to activate 45 may comprise the instruction to initiating a move of the autonomous device from a first idle location to a second active location. The autonomous device may have a default, pre-programmed, second active location. The instruction may alternatively additionally contain information about where this second location is, wherein several optional active locations are available. The autonomous device 4 may be provided by a drone (unmanned aerial vehicle (UAV)), which may be able to fly between an idle position and an active position. The autonomous device may in the idle position be able to communicate with the wireless communication device 1 at least over a low data capacity protocol, allowing the wireless communication device 1 to actively control when the autonomous device 4 is to move from an idle position to an active position. The idle position is typically on ground, wherein the autonomous device 4 e.g. can charge its batteries. The active position is typically in an elevated position over ground, wherein connection to one or more base station 2 is achieved.

The autonomous device 4 may be outside high data capacity coverage of the cellular network 5 in the first idle location but is connectable to the cellular network 5 in the second active location with high data capacity. High data capacity of a cellular network within the description and claims means app-coverage, streaming, HD video streaming, video conferencing, file downloading, image transferring, and online gaming. High data capacity may be provided by e.g. File Transfer Protocol (FTP) or BitTorrent. Middle data capacity of a cellular network within the description means voice-coverage, email downloads, voice over IP, and web browsing. Middle data capacity may be provided by e.g. Simple Mail Transfer protocol (SMTP), Real Time Protocol (RTP) or Hypertext transfer protocol (HTTP). Low data capacity of a cellular network within the description and claims means NAS-signalling (Non-access stratum-signalling), application level signalling, only one radio carrier for control signalling, and chat applications (presence, messaging). Low data capacity may be provided by e.g. Extensible Messaging and Presence Protocol (XMPP) or Session Initiation Protocol (SIP). The low data capacity is however sufficient to communicate instructions to/from the autonomous device 4.

The instruction to activate 45 may comprise an instruction to signal the autonomous device over a low data capacity protocol.

The live data features, of the wireless communication device, may comprise one or more of the following: signal strength, location, wireless communication device activation, performance measurement, and configuration measurement.

The instruction to predict may comprise an instruction to utilize forecasting, such as a time series forecasting.

A historical model database may be configured to provide a trained classifier for predicting a need to increase coverage or capacity of the cellular network. In order to obtain historical data from wireless communication devices to train the classifier, historical usage of a wireless communication device resulting in activating a launch of the autonomous device or not may be used. The trained classifier may periodically, or continuously, be updated once new data is received.

For initialisation of a historical model, i.e. bootstrapping, an initial location value may be added instead of starting with an empty database. Geographical data, such as where bad coverage exists in cellular networks may be utilized to add initial historical data to the model.

The live and historical data location features may comprise information about interaction, location, signal strength and coverage. A classifier 80 having such features is illustrated in FIG. 7.

FIG. 7 is a schematic diagram of a launch classifier 80. Historical data about utilization of an autonomous device 4 being launched, or not being launched, is used to train the launch classifier 80. Data for all wireless communication devices in a coverage area of the autonomous device 4 may be logged. The classifier 80 may be trained by e.g. feeding interaction of a user with a wireless communication device and comparing it with a data capacity the wireless communication device has to the cellular network. When the data capacity is at a desirable level a classification of no launch is selected, whereas when the data capacity is below a desirable level a classification of launch is selected. Further, the classifier 80 may be trained by feeding it with other live data features, of the wireless communication device, such as: signal strength, location, wireless communication device activation, performance measurement, and configuration measurement.

As a result of having the historical model with communication features, the launch classifier may be trained using Machine Learning techniques. Such a classifier identifies launching patterns of the autonomous device, and given input from other wireless communication devices, it can predict the probability of launching the autonomous device for a specific wireless communication device.

A simple classification is digital in its output, classes e.g. classified into launch or not launch. A more complex classification may be provided having classes with likelihood for launching. High confidence probability may e.g. be at 0.9 likelihood of launching the autonomous device, and a low confidence probability may e.g. be at 0.55 likelihood of launching the autonomous device. Further, a more complex classification may have more classes, such as no launch, launch location 1, launch location 2 etc.

The launch classifier 80 may e.g. be a Support Vector Machine (SVM), a decision tree, a neural network or a Bayesian network. Machine learning based on SVM, decision tree and neural networks support may be used to support e.g. two classes, launching and not launching. Machine learning based on Bayesian networks and neural networks may be used to support more advanced classifiers e.g. providing probability classes between 0-1.

A launch class may be obtained by training a SVM and feeding live data to the trained SVM.

The instruction to predict 43 may comprise an instruction to detecting one or more of the following: application use, scheduled event, user action on wireless communication device, and measurements in a wireless communication device.

The instructions may comprise the further instruction to deactivate 46 the autonomous device. The autonomous device 4 has limited capacity to stay in active position and need to move to idle position at some point. The instruction to deactivate 46 the autonomous device 4 may be when there is no more need to increase coverage or capacity predicted.

The instructions may comprise the further instructions to: collect 40 use data of a wireless communication device 1; store 41 the use data; and identify 42 a use pattern from the stored use data.

The network device 20 is in an embodiment implemented in the wireless communication device 1, which is illustrated in FIG. 6A. An autonomous device 4 may be controlled by a specific wireless communication device 1, wherein the autonomous device 4 will be a personal ASTA.

The network device 20 is in an embodiment implemented in the core network 3, such as in or by an SGSN (Serving GPRS (General Packet Radio Service) Support Node), a GGSN (Gateway GPRS Support Node), a Serving Gateway, or a Packet Data Network Gateway, which is illustrated in FIG. 6B. The network device 20 may in other embodiments be implemented in a Business Support System (BSS) device and/or in an Operational Support System (OSS) device, typically owned by the network operator owning the core network 3. An autonomous device 4 may be controlled by the core network 3, wherein a plurality of wireless communication devices 1 may connect to the cellular network there through.

The network device 20 is in another embodiment implemented in the autonomous device 4, which is illustrated in FIG. 6C. The autonomous device 4 may be controlled by itself, e.g. periodically putting itself in network coverage of the cellular network to download data or schedule active locations and times.

Figure 3:
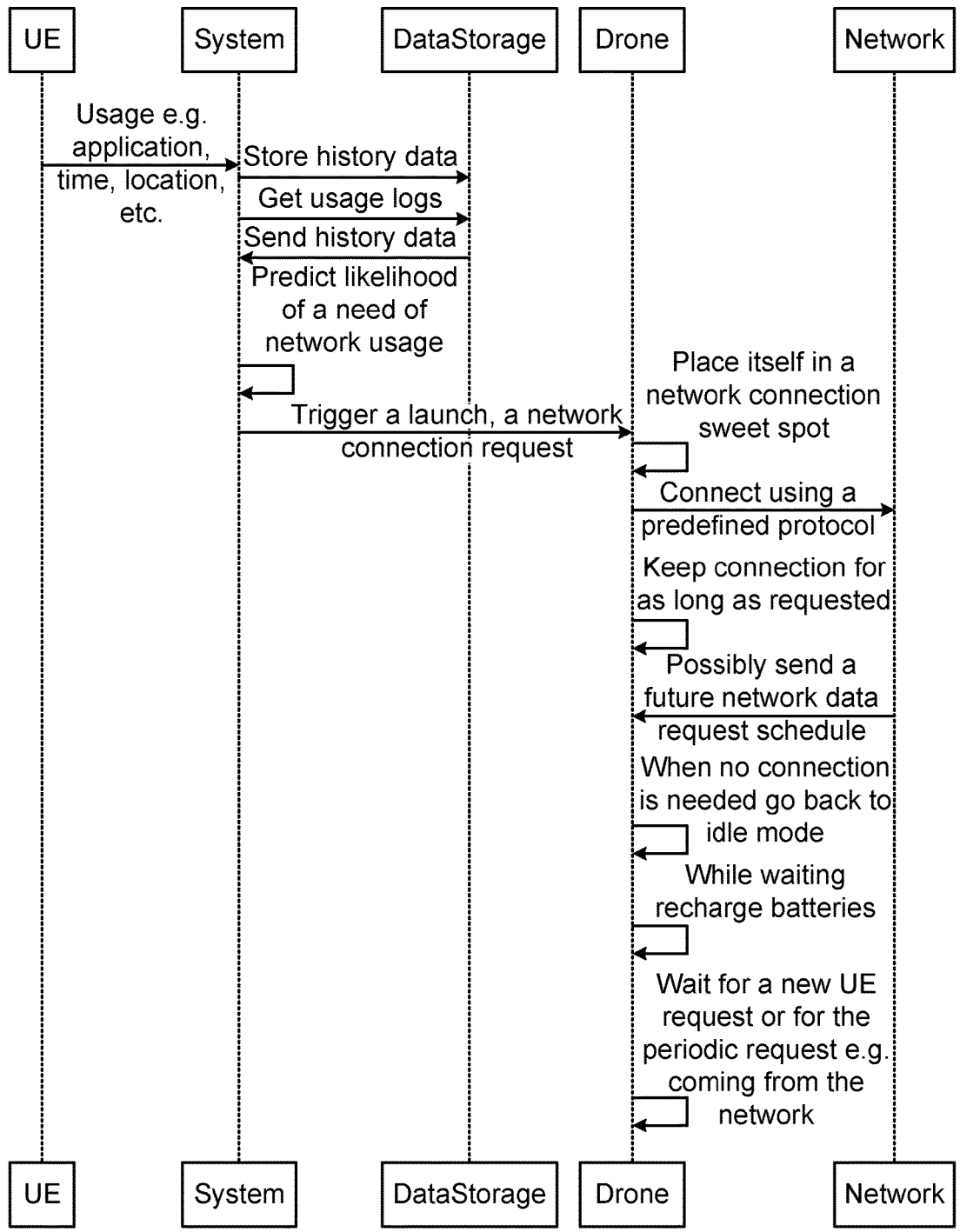
FIG. 3 is a schematic diagram illustrating signalling in a cellular network of an embodiment presented herein.

Signalling in a cellular network 5 according to one embodiment is presented with reference to FIG. 3.

Use data of a wireless communication device 1, such as a user equipment, is transferred to the network device 20, e.g. by a HTTP Post message. The use data is then stored as history data in a historical model database, e.g. by a HTTP Post message. For prediction, historical data is requested, e.g. by a HTTP Post message, from the historical model database, which history data then is sent to the network device 20, e.g. by a HTTP Get message. The network device 20 predicts the likelihood of a need for increased coverage or capacity of the cellular network 5, based on the history model. When such a need is detected, the network device 20 triggers a launch of the autonomous device 4, e.g. by a HTTP Post message. The autonomous device 4 then moves to an active position wherein one or more users may take advantage of increased coverage and/or capacity. The autonomous device 4 connects to the core network 3 using a predefined protocol, e.g. by a HTTP Post message. The connection is then kept as long as requested. The autonomous device 4 may receive a request for scheduling of future connections, while it is in active position, e.g. by a HTTP Post message. When connection is no longer needed, the autonomous device 4 goes back to idle mode. In idle mode the autonomous device 4 recharges its batteries, and waits for a new request from a wireless device 1 or for periodic requests from the core network 3.

Figure 4A:
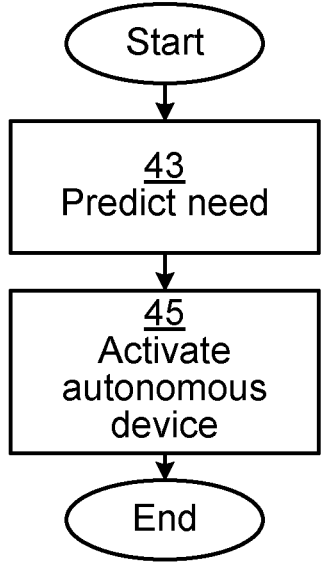
FIGS. 4A-4B are flow charts illustrating methods for embodiments presented herein.

An embodiment of a method for controlling an autonomous device 4 of a cellular network 5 is shown in FIG. 4A.

The method is performed by the network device 20 and comprises the steps of: predicting 43 a need to increase coverage of the cellular network or a need to increase capacity of the cellular network, comprising the steps of: inputting live data features into a trained classifier; and outputting a launch class from the classifier; and activating 45 an autonomous device 4 of the cellular network, to improve the cellular network.

Figure 4B:
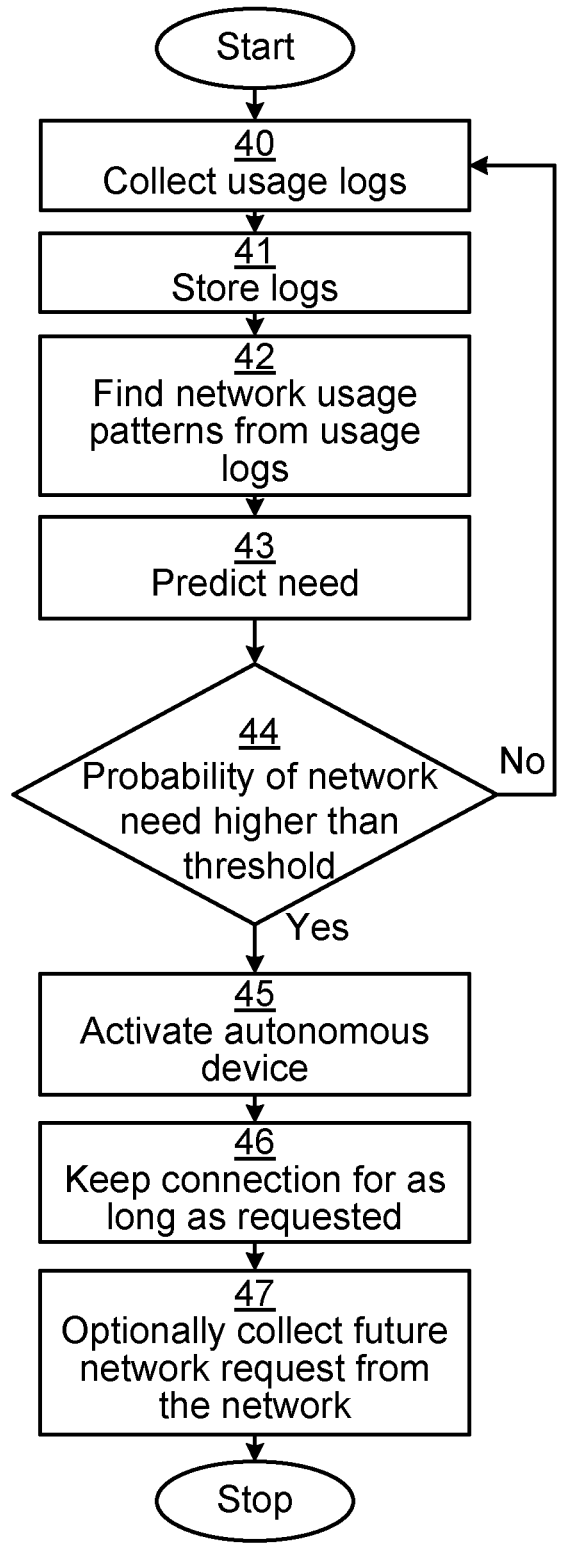

In one embodiment a method for controlling an autonomous device 4 of a cellular network 5 is shown in FIG. 4B.

The method may comprise the further step of connecting 46 a wireless communication device 1 to the cellular network through the autonomous device 4.

The step of activating 45 may comprise initiating a move of the autonomous device from a first idle location to a second active location.

The autonomous device may be outside high data capacity coverage of the cellular network in the first idle location and is connectable to the cellular network in the second active location with high data capacity.

The step of activating 45 may comprise signalling the autonomous device over a low data capacity protocol.

The live data features may comprise one or more of the following: signal strength, location, wireless communication device activation, performance measurement, and configuration measurement.

The classifier 80 may be a Support Vector Machine (SVM), a decision tree, a neural network or a Bayesian network.

The step of predicting may comprise utilization of a time series forecasting.

The step of determining may comprise detecting one or more of the following: application use, scheduled event, user action on wireless communication device, and measurements in a wireless communication device.

The method may comprise the further step of: deactivating 46 the autonomous device.

The method may comprise the further steps of: collecting 40 use data of a wireless communication device 1; storing 41 the use data; and identifying 42 a use pattern from the stored use data.

The computer program 64, 65 for controlling an autonomous device 4 of a cellular network 5, comprises computer program code which, when run on a network device 20, causes the network device 20 to: predict 43 a need to increase coverage of the cellular network or a need to increase capacity of the cellular network; and activate 45 an autonomous device 4 of the cellular network, to improve the cellular network.

The computer program product 62, 63 comprises the computer program 64 and a computer readable storage means on which the computer program 64, 65 is stored.

Figure 8:
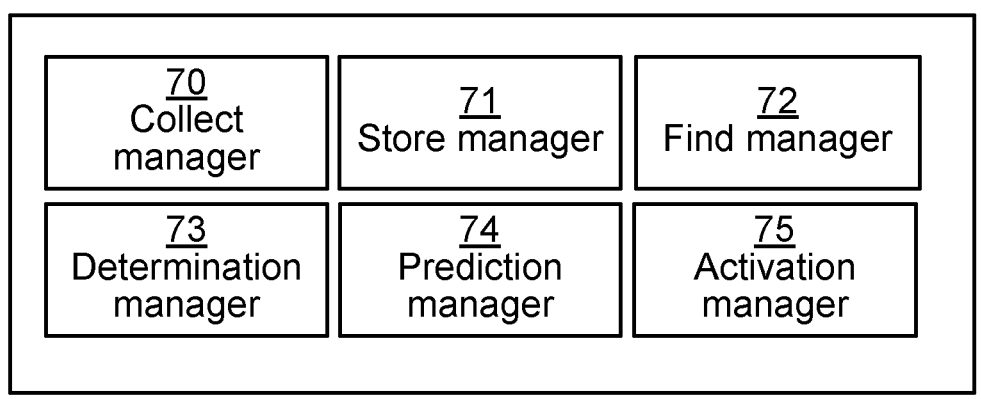
FIG. 8 is a schematic diagram showing functional modules of a network device.

FIG. 8 is a schematic diagram showing functional blocks of the network device 20. The modules may be implemented as only software instructions such as a computer program executing in the network device or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 4A-4B, comprising a collect manager 70, a store manager 71, a find manager 72, a determination manager 73, a prediction manager 74, and an activation manager 75. In the embodiments where one or more of the modules are implemented by a computer program, then it shall be understood that these modules do not have to correspond to programming modules, but can be written as instructions according to the programming language in which they would be implemented, since some programming languages do not typically contain programming modules.

The collect manager 70 is arranged to collect use data of the wireless communication device. This module corresponds to the collect step 40 of FIG. 4B. This module can e.g. be implemented by the processor 30 of FIG. 5, when running the computer program.

The store manager 71 is arranged to store the collected use data. This module corresponds to the store step 41 of FIG. 4B. This module can e.g. be implemented by the processor 30 of FIG. 5, when running the computer program.

The find manager 72 is arranged to identify a use pattern from the stored use data. This module corresponds to the determining step 42 of FIG. 4B. This module can e.g. be implemented by the processor 30 of FIG. 5, when running the computer program.

The determination manager 73 is arranged to determine a need to increase coverage or a need to increase capacity of the cellular network. This module corresponds to the predict step 43 of FIGS. 4A and 4B. This module can e.g. be implemented by the processor 30 of FIG. 5, when running the computer program.

The prediction manager 74 is arranged to predict such a need. This module corresponds to the probability step 44 of FIG. 4B. This module can e.g. be implemented by the processor 30 of FIG. 5, when running the computer program.

The activation manager 75 is arranged to activate the autonomous device of the cellular network, to improve the cellular network. This module corresponds to the activate step 45 of FIGS. 4A and 4B. This module can e.g. be implemented by the processor 30 of FIG. 5, when running the computer program.

An embodiment of a network device 20 for a cellular network 5, the network device being arranged to control an autonomous device 4 is presented.

The network device 20 comprises: a determination manager 73 configured to determine a need to increase coverage of the cellular network or a need to increase capacity of the cellular network; a prediction manager 74 configured to: input live data features into a trained classifier 80; and output a launch class from the classifier 80; and an activation manager 75 configured to activate an autonomous device 4 of the cellular network, to improve the cellular network.

The network device 20 may further comprise a connection manager 76 configured to connect a wireless communication device 1 to the cellular network through the autonomous device 4.

The activation manager 75 may be configured to initiating a move of the autonomous device from a first idle location to a second active location.

The autonomous device 4 may be outside high data capacity coverage of the cellular network in the first idle location and is connectable to the cellular network in the second active location with high data capacity.

The activation manager 75 may be configured to signal the autonomous device over a low data capacity protocol.

The network device 20 may further comprise a prediction manager 74 configured to predict the need.

The live data features may comprise one or more of the following: signal strength, location, wireless communication device activation, performance measurement, and configuration measurement.

The classifier 80 may be a Support Vector Machine (SVM), a decision tree, a neural network or a Bayesian network.

The prediction manager 74 may be configured to utilize a time series forecasting.

The determination manager 73 may be configured to detect one or more of the following: application use, scheduled event, user action on wireless communication device, and measurements in a wireless communication device.

The activation manager 75 may further be configured to deactivate 46 the autonomous device.

The network device 20 may further comprise: a collection manager 70 configured to collect 40 use data of a wireless communication device 1; a storage manager 71 configured to store 41 the use data; and a find manager 72 configured to identify 42 a use pattern from the stored use data.

The invention has mainly been described above with reference to a few embodiments. However, as is readily appreciated by a person skilled in the art, other embodiments than the ones disclosed above are equally possible within the scope of the invention, as defined by the appended claims.

The invention claimed is:

1. A method for controlling an autonomous device of a cellular network, the method being performed by a network device and comprising the steps of:
   predicting a need to increase coverage of said cellular network or a need to increase capacity of said cellular network, comprising the steps of:
      inputting live data features into a trained classifier; and
      outputting a launch class from said classifier;
   activating an autonomous device of said cellular network, to improve said cellular network, wherein said step of activating comprises initiating a physical move of said autonomous device from a first idle location to a second active location; and
   enabling a wireless communication device to be connected to said cellular network through said autonomous device.

2. The method according to claim 1, wherein said autonomous device is outside high data capacity coverage of said cellular network in said first idle location and is connectable to said cellular network in said second active location with high data capacity.

3. The method according to claim 1, wherein said step of activating comprises signalling said autonomous device over a low data capacity protocol.

4. The method according to claim 1, wherein said live data features comprise one or more of the following: signal strength, location, wireless communication device activation, performance measurement, and configuration measurement.

5. The method according to claim 1, wherein said classifier is a Support Vector Machine, a decision tree, a neural network or a Bayesian network.

6. The method according to claim 1, wherein said step of predicting comprises utilization of a time series forecasting.

7. The method according to claim 1, comprising the further step of determining, wherein the step of determining comprises detecting one or more of the following: application use, scheduled event, user action on said wireless communication device, and measurements in said wireless communication device.

8. The method according to claim 1, comprising the further step of:
deactivating said autonomous device.

9. The method according to claim 1, comprising the further steps of:
collecting use data of said wireless communication device;
storing said use data; and
identifying a use pattern from the stored use data.

10. A network device for a cellular network, said network device arranged to control an autonomous device of the network device comprising:
a processor; and
a computer program product storing instructions that, when executed by the processor, causes the network device to:
predict a need to increase coverage of said cellular network or a need to increase capacity of said cellular network, comprising:
input live data features into a trained classifier; and
output a launch class from said classifier;
activate an autonomous device of said cellular network, to improve said cellular network, wherein said instruction to activate comprises the instruction to initiating a physical move of said autonomous device from a first idle location to a second active location; and
enable a wireless communication device to be connected to said cellular network through said autonomous device.

11. The network device according to claim 10, wherein said autonomous device is outside high data capacity coverage of said cellular network in said first idle location and is connectable to said cellular network in said second active location with high data capacity.

12. The network device according to claim 10, wherein said instruction to activate comprises an instruction to signal said autonomous device over a low data capacity protocol.

13. The network device according to claim 10, wherein said live data features comprise one or more of the following: signal strength, location, wireless communication device activation, performance measurement, and configuration measurement.

14. The network device according to claim 10, wherein said classifier is a Support Vector Machine, a decision tree, a neural network or a Bayesian network.

15. The network device according to claim 14, wherein said instruction to predict comprises an instruction to utilize a time series forecasting.

16. The network device according to claim 10, wherein said instruction to predict comprises instruction to detecting one or more of the following: application use, scheduled event, user action on said wireless communication device, and measurements in said wireless communication device.

17. The network device according to claim 10, wherein said instructions comprise the further instruction to:
deactivate said autonomous device.

18. The network device according to claim 10, wherein said instructions comprise the further instructions to:
collect use data of said wireless communication device;
store said use data; and
identify a use pattern from the stored use data.

19. A computer program product comprising a computer program and a computer readable storage memory on which the computer program is stored, wherein the computer program comprises computer program code which, when run on a network device for a cellular network, causes the network device to:
predict a need to increase coverage of said cellular network or a need to increase capacity of said cellular network, comprising:
input live data features into a trained classifier; and
output a launch class from said classifier;
activate an autonomous device of said cellular network, to improve said cellular network, by initiating a physical move of said autonomous device from a first idle location to a second active location; and
enable a wireless communication device to be connected to said cellular network through said autonomous device.

* * * * *